Oct. 18, 1960
R. L. WALTON
2,956,540
WATERING AND FEED TROUGH FOR LIVESTOCK
Filed May 20, 1959
2 Sheets-Sheet 1
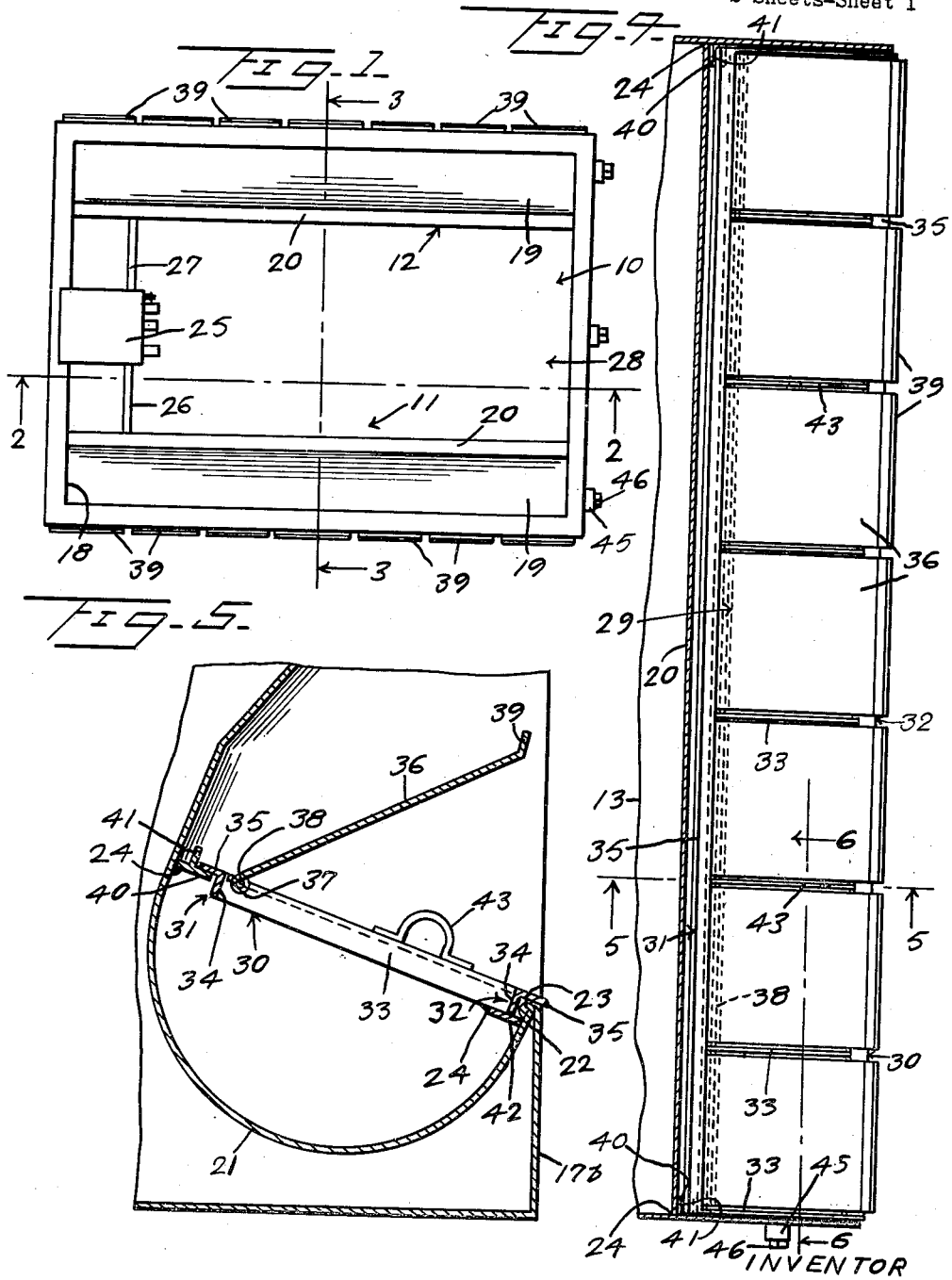
INVENTOR
R. L. WALTON
BY John N. Randolph
ATTORNEY Oct. 18, 1960 R. L. WALTON 2,956,540
WATERING AND FEED TROUGH FOR LIVESTOCK
Filed May 20, 1959 2 Sheets-Sheet 2
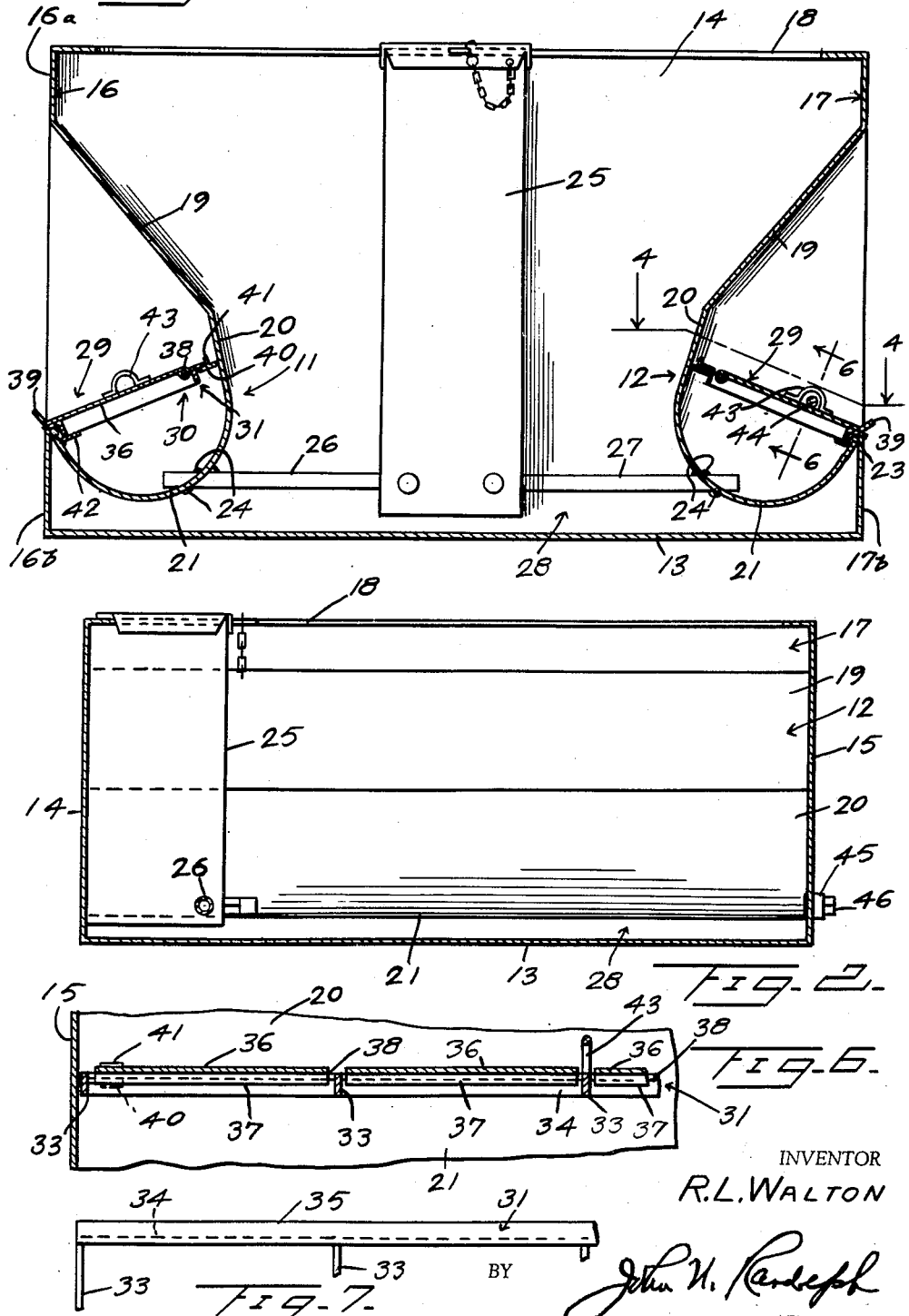
INVENTOR
R.L. WALTON
BY
ATTORNEY

United States Patent Office 2,956,540
Patented Oct. 18, 1960

2,956,540

WATERING AND FEED TROUGH FOR LIVESTOCK

Robert L. Walton, Princeton, Ill., assignor to Parker Feeders, Inc., Silver Lake, Ind., a corporation of Indiana Filed May 20, 1959, Ser. No. 814,443

7 Claims. (Cl. 119—78)

This invention relates to an improved construction of trough and trough cover for watering and feeding livestock.

More particularly, it is an object of the present invention to provide a trough having a round bottom which may be readily cleaned and maintained in a sanitary condition and including a cover provided with a plurality of individual closure elements which may be selectively opened for affording access to the contents of the trough, and which cover may be readily removed, as a unit, from the trough to facilitate cleaning of the trough.

A further object of the invention is to provide a trough cover having means whereby the individual closure elements of the cover may be effectively maintained in a closed position.

Various other objects and advantages of the invention will hereinafter become more fully apparent from the following description of the drawings, illustrating a presently preferred embodiment thereof, and wherein:

Figure 1 is a plan view of a livestock waterer shown equipped with the improved troughs;

Figure 2 is an enlarged longitudinal sectional view thereof, taken substantially along a plane as indicated by the line 2—2 of Figure 1;

Figure 3 is an enlarged cross sectional view taken substantially along a plane as indicated by the line 3—3 of Figure 1;

Figure 4 is a substantially horizontal sectional view, taken along the line 4—4 of Figure 3;

Figure 5 is an enlarged fragmentary transverse sectional view, taken substantially along a plane as indicated by the line 5—5 of Figure 4;

Figure 6 is a fragmentary longitudinal sectional view, taken substantially along a plane as indicated by the line 6—6 of Figure 4, and Figure 7 is a fragmentary plan view of a portion of the frame of one of the trough covers.

Referring more specifically to the drawings, for the purpose of illustrating a preferred application and use of the improved livestock trough, an open top watering tank 10 is illustrated, equipped with two of the troughs, designated generally 11 and 12. The water tank or reservoir 10 includes a substantially flat bottom 13, end walls 14 and 15, side walls 16 and 17, and an open top 18. The trough 11 is formed in and as a part of the side wall 16, and the trough 12 similarly provides a part of the side wall 17. Thus, a description of either trough will suffice for both.

The trough 11, for example, includes an upper portion 19 forming a substantially straight downwardly and inwardly inclined extension of a vertical upper part 16a of the wall 16. Said upper trough portion 19 terminates at its lower end in a substantially straight extension 20, which is likewise inclined downwardly and inwardly of the tank 10, but which is disposed more nearly vertical than the upper trough portion 19. The trough portion 20 merges integrally with one longitudinal edge of the bottom portion 21 of the trough, which is nearly semi-circular in cross section. The other, outer longitudinal edge 22 of the trough bottom 21 joins with and is sealed to the upper edge of the bottom portion 16b of the side wall 16. This is more clearly illustrated in Figure 5 showing the edge 22 of the trough 12 connected to the upper edge of the bottom portion 17b of the side wall 17, and wherein an inwardly rolled bead 23, formed at the joint of the upper edge of the side wall portion 17b and the trough bottom edge 22, is clearly illustrated. As seen in Figures 3 and 5, the troughs 11 and 12 are disposed so that the trough bottoms are inclined downwardly and outwardly and open upwardly and outwardly with respect to the side walls 16 and 17. The portions 19, 20 and 21 of the troughs 11 and 12 are coextensive with the side walls 16 and 17 and are secured at their ends to the end walls 14 and 15, as by welding, as seen at 24 in Figure 4, for effectively sealing the trough ends and so that portions of the end walls 14 and 15 of the tank constitute end walls of the troughs 11 and 12.

A conventional control box 25 is disposed within the tank 10 and is supported by the end wall 14. Tubes or conduits 26 and 27 extend laterally of the tank 10 from opposite sides of the bottom portion of the control box 25 and have outer ends extending through portions of the trough bottoms 21 and so as to discharge into said trough bottoms, as seen in Figure 3. The trough bottoms 21 are suitably sealed around the conduits 26 and 27, as by welding, as seen at 24 in Figure 3, to prevent leakage from the bottom portions of the troughs 11 and 12. A large chamber 28 of the tank 10, disposed between the troughs 11 and 12 and the end walls 14 and 15, and in which the control box 25 is disposed, is adapted to provide a reservoir for water which can be supplied thereto through the open top 18. The control box 25 contains suitable valve means, not shown, of a conventional type for regulating the flow of water from the reservoir 28 into said control box and therefrom through the conduits 26 and 27 into the trough bottoms 21 for maintaining a desired water level in the troughs and which is below the level of the bead 23.

Each trough 11 and 12 additionally includes a removable and adjustable cover 29 for the trough bottom 21 thereof. Each cover 29 includes an elongated frame, designated generally 30, composed of two longitudinally extending side frame members 31 and 32 and a plurality, preferably eight cross frame members 33. The side frame members 31 and 32 are preferably formed of angle iron and each includes a downwardly extending inner flange 34 and an outwardly extending top flange 35. The cross frame members 33 each comprises a bar which is disposed in a vertical plane and which extends between and is secured to the inner flanges 34. The two end bars or cross frame members 33 constitute the ends of the frame 30, which is of a length to extend substantially from end-to-end of the trough 11 or 12, as seen in Figure 4.

Each cover 29 includes a plurality of hinged closures 36, each of which is preferably formed of a rigid strip of sheet metal having a downwardly and inwardly rolled back rear end forming a barrel portion 37. The frame 29 additionally includes a rod 38 which extends through the barrel portion 37 of each of the closures 36 and through each of the cross frame members 33. The rod 38 is located adjacent to the side frame member 31. The barrel portions 37 turnably engage the rod 38 and turnably fit between the cross frame members 33, so that the cover 29 includes seven hinge closures 36. Said closures 36, in the closed positions thereof, as seen in Figure 3, extend forwardly and downwardly from the rod 38 across the side frame member 32 and each have a portion resting on and supported by the top portion 35 of the frame member 32. Each closure 36 has an upwardly flared free end 39 which extends upwardly from the part of said closure resting upon the frame member 32, and which can be readily engaged for swinging the closure upwardly to an open position.

Bracket members 40, preferably comprising small plates or lugs are secured, as by welding, as seen at 24, to the trough portion 20 and extend inwardly therefrom, said brackets 40 preferably being located adjacent the ends of the trough, and each being provided with an upstanding stop portion 41, located nearer the trough portion 20 than the inner edge of the bracket 40. The frame 30 also includes rigid lug members 42, which are welded, as seen at 24, to certain of the cross braces 33 and which extend outwardly beneath the depending inner wall 34 of the side frame member 32, a distance less than the distance that the top flange 35 extends outwardly from the inner flange 34 of said member 32, as best seen in Figure 5.

Accordingly, it will be readily apparent that the complete cover 29 can be removed from an applied position by swinging the inner or rear portion 31 of the cover frame upwardly while the outer or front frame portion 32 fulcrums about the inwardly rolled or beaded edge 23, on which the flange 35 thereof rests, for disengaging the lugs 42 from beneath the bead 23, so that the cover 29 can then be lifted upwardly and out of the trough. With the cover 29 removed, it will be readily apparent that the rounded bottom 21 of the trough can be easily cleaned and thus readily maintained in a clean and sanitary condition. To apply the cover 29, the frame member 32 is applied onto the bead 23 after which the cover is swung downwardly and inwardly of the trough until the top flange 35 assumes a position resting upon the brackets 40, in which position the flange 35 of the front frame member 32 is disposed to rest upon the bead 23 and the lugs 42 engage under the bead 23 to prevent the front portion of the frame being lifted upwardly. The top flange 35 of the rear frame member 31 engages the stops 41 to prevent the frame 30 from sliding rearwardly away from the bead 23. It will be noted that the cover 29 is inclined downwardly and forwardly from the rear frame member 31 to the front frame member 32, and that the closures 36 are similarly inclined, in the closed positions thereof, for normally closing the bottom 21 of the trough. However, it will be obvious that an animal can readily lift one of the closures 36, by the nose of the animal engaging under the upturned lip 39 thereof for raising the closure to its open position of Figure 5, to afford the animal access to the contents of the trough bottom 21 through the cover frame 30, and that said closure will resume a closed position after the animal removes its head from beneath the closure. Certain of the intermediate cross frame members 33 are provided with loops 43 which are fixed to and extend upwardly therefrom. It will be readily apparent that a rod can be inserted through the loops 43, as seen at 44 in Figure 3, over the closures 36, for retaining the closures in closed positions to deny the animals access to the contents of the trough bottom.

The end wall 15 is shown provided with outlet ports 45, one of which communicates with the bottom portion of the trough 11, a second of which communicates with the bottom portion of the trough 12, and the other of which communicates with the bottom of the chamber or reservoir 28. Said drain ports 45 are provided with closures 46 which may be removed for draining the reservoir and troughs.

While the trough has been described as a watering trough, it will be readily understood that the same construction of trough including the cover 29, may be utilized as a feed trough for livestock.

Various modifications and changes are contemplated and may be resorted to, without departing from the function or scope of the invention as hereinafter defined by the appended claims.

I claim as my invention:

1. A livestock watering or feeding trough having a bottom of substantially semicircular cross section and disposed at an incline to open upwardly and outwardly of the trough, said bottom having a front edge and a back part rising to above the level of the front edge, said trough including a rear wall forming an extension of the back part of the bottom, a cover for closing the trough bottom from end-to-end thereof including an elongated frame having a front frame member and a rear frame member, said frame including a rod extending from end-to-end thereof and disposed adjacent said rear frame member, said cover including a plurality of closures each having a rear edge connected to said rod and hingedly connected thereby to the frame and a front edge extending beyond said front frame member in a closed position of the closure, said closures having portions, located adjacent the front edges thereof, resting on said front frame member and supported thereby in a closed position, said front and rear frame members having outturned flanges, means carried by the trough and engaged by said outturned flanges for detachably supporting the cover within the trough and over the trough bottom and at an incline downwardly and outwardly relative to the trough.

2. A trough as in claim 1, said frame including a plurality of cross members extending between and secured to said front and rear frame members and between which said closures are hingedly mounted.

3. A trough as in claim 2, loop members fixed to and extending upwardly from certain of said cross frame members, and a rod extending through said loop members and overlying the closure members for retaining said closure members in closed positions.

4. A trough as in claim 1, said front edge of the trough bottom having an inwardly rolled bead forming a part of the cover supporting means, and said front frame member resting on said bead and having lugs fixed thereto and underlying the bead.

5. A trough as in claim 4, upstanding stop members carried by another part of the cover supporting means and engaged by the outturned flange of said rear frame member to prevent rearward sliding movement of the frame in the trough for retaining said lugs in engagement under the bead when the outturned flange of the rear frame member is in engagement with said stop members.

6. A trough as in claim 1, said trough forming a part of and opening outwardly through a storage tank wall, and conduit means opening into the trough bottom and communicating with the storage tank for supplying the trough from said storage tank.

7. A livestock trough comprising a substantially upright wall, a trough forming a part of said wall and opening outwardly thereof, said trough including a bottom of substantially arcuate cross section opening upwardly and outwardly relative to the wall, an elongated frame, a plurality of closures disposed crosswise of the frame and each having a hinged rear end, means hingedly mounting the closures to the frame at said rear ends, means demountably supporting the frame within the trough for positioning the closures to close the open bottom of the trough, and each of said closures having a free end extending outwardly from the trough and from a side of the frame and providing a lip to be engaged for swinging the closure upwardly relative to the frame and to a raised open position relative to the trough bottom, said closures being removable with said frame as a unit from the trough.

References Cited in the file of this patent

UNITED STATES PATENTS

| | | |
|---|---|---|
| 1,062,792 | Nelson | May 27, 1913 |
| 1,387,483 | Glidden | Aug. 16, 1921 |
| 1,465,763 | Heacock | Aug. 21, 1923 |
| 1,469,961 | Rood | Oct. 9, 1923 |
| 1,725,628 | Gerhardt | Aug. 20, 1929 |
| 2,310,200 | Callis | Feb. 9, 1943 |
| 2,672,125 | Murphy | Mar. 16, 1954 |
| 2,914,025 | McMurray | Nov. 24, 1959 |